US 9,701,256 B2

(12) United States Patent
Haymond et al.

(10) Patent No.: US 9,701,256 B2
(45) Date of Patent: Jul. 11, 2017

(54) MOUNTING CLIP

(71) Applicant: Handstands Promo, LLC., Alpine, UT (US)

(72) Inventors: Bryce Haymond, West Valley, UT (US); Jason Fogg, Lake Point, UT (US)

(73) Assignee: Handstands Promo, LLC, Salt Lake City, UT (US)

( * ) Notice: Subject to any disclaimer, the term of this patent is extended or adjusted under 35 U.S.C. 154(b) by 0 days.

(21) Appl. No.: 14/842,347

(22) Filed: Sep. 1, 2015

(65) Prior Publication Data

US 2016/0159291 A1 Jun. 9, 2016

Related U.S. Application Data

(60) Provisional application No. 62/089,584, filed on Dec. 9, 2014.

(51) Int. Cl.
*B60R 11/02* (2006.01)
*B60R 11/00* (2006.01)

(52) U.S. Cl.
CPC ....... *B60R 11/02* (2013.01); *B60R 2011/0008* (2013.01); *B60R 2011/0071* (2013.01); *B60R 2011/0089* (2013.01)

(58) Field of Classification Search
CPC ..... B60R 2011/0008; B60R 2011/0059; B60R 2011/0085; B60R 2011/0071; B60R 11/02
See application file for complete search history.

(56) References Cited

U.S. PATENT DOCUMENTS

| | | | | |
|---|---|---|---|---|
| 5,979,724 A | * | 11/1999 | Loewenthal, Jr. | .. B60R 11/0241 224/483 |
| 6,163,997 A | * | 12/2000 | Deralas | .................... A47G 1/06 40/593 |
| 7,837,166 B2 | * | 11/2010 | Liao | ..................... F16M 11/041 24/523 |
| 8,272,548 B2 | * | 9/2012 | Le Texier | ............... B60R 11/02 224/281 |
| 8,424,825 B2 | * | 4/2013 | Somuah | .............. B60R 11/0235 248/130 |
| 8,490,846 B1 | | 7/2013 | Wheatley et al. | |
| D690,707 S | | 10/2013 | Minn et al. | |
| 8,727,192 B2 | * | 5/2014 | Lai | ..................... B60R 11/0241 224/282 |
| 8,851,349 B2 | | 10/2014 | Wheatley et al. | |

(Continued)

OTHER PUBLICATIONS

Loukin, "Colored Flexible 5-Inch Flex Leg Mini-Spider Phone Tripod", http://skl.en.alibaba.com/product/1092461034-801625617/Colored_Flexible_5_Inch_Flex_Leg_Mini_Spider_Tripod.html , As accessed on Aug. 30, 2016, 6 pages.

*Primary Examiner* — Justin Larson
(74) *Attorney, Agent, or Firm* — Thorpe, North & Western, LLP (57) ABSTRACT

A holder device to hold a mobile device with respect to a vent or a surface of a vehicle has a ball-and-socket joint pivotally coupling together a clip to engage the vent or surface, and a clamp to releasably carry the mobile device. The ball-and-socket joint has a ball pivotally disposed in a socket. The ball-and-socket joint has a friction fit or an interference fit between the ball and the socket sufficient to hold a position between the ball and the socket under a weight of the clamp and the mobile device without an applied external force.

21 Claims, 4 Drawing Sheets

(56) References Cited

U.S. PATENT DOCUMENTS

| | | |
|---|---|---|
| 9,080,714 B2 | 7/2015 | Minn et al. |
| D739,396 S | 9/2015 | Wheatley et al. |
| 9,442,349 B2 * | 9/2016 | Hyers ................. F16B 2/10 |
| 9,445,512 B2 * | 9/2016 | Wang .................. H05K 5/0204 |
| 2013/0233986 A1 * | 9/2013 | Rasheta ............... G03B 17/561 |
| | | 248/205.1 |
| 2014/0042285 A1 * | 2/2014 | Carnevali .............. B60R 11/02 |
| | | 248/316.4 |
| 2014/0097306 A1 * | 4/2014 | Hale ................... F16M 13/022 |
| | | 248/122.1 |
| 2014/0209777 A1 * | 7/2014 | Klemin ................ F16M 13/04 |
| | | 248/544 |
| 2014/0291465 A1 * | 10/2014 | Mendoza .............. F16M 13/02 |
| | | 248/346.06 |
| 2015/0028075 A1 * | 1/2015 | Khatchatrian ......... B60R 11/02 |
| | | 224/483 |
| 2016/0159291 A1 * | 6/2016 | Haymond ............. B60R 11/02 |
| | | 224/571 |
| 2016/0174396 A1 * | 6/2016 | Wang .................. H05K 5/0204 |
| | | 248/231.51 |

\* cited by examiner

MOUNTING CLIP

PRIORITY CLAIM(S)

Priority is claimed to U.S. Provisional Patent Application Ser. No. 62/089,584, filed Dec. 9, 2014; which is hereby incorporated herein by reference.

BACKGROUND

Field of the Invention

The present invention relates generally to a mounting clip or clamp for securing a cellular phone or the like, such as in a vehicle.

Related Art

Cellular phones and GPS units are commonly carried by users in vehicles. But the use of such cellular phones and GPS units while driving can be distracting and dangerous.

SUMMARY OF THE INVENTION

It has been recognized that it would be advantageous to develop a device to securely hold a mobile device, such as a cellular phone, in a vehicle. In addition, it has been recognized that a vehicle's vent, or louver(s) thereof, can be utilized to hold the mobile device. In addition, it has been recognized that it would be advantageous to develop a device to easily mount a cellular phone to the air vent in a vehicle for navigation, music identification, keeping tabs on notifications, etc.; and that keeps the phone near the user so that the screen is easily visible, but out of hand to avoid dangers of user during driving.

The invention provides a holder device in combination with a mobile device and a vent or a surface of a vehicle. The holder device comprises a mount affixable to the vent or the surface of the vehicle. A clamp is pivotally coupled to the mount. The clamp is spring-loaded and has an adjustable width gap for receiving the mobile device therein. The clamp comprises a base pivotally coupled to the mount. The base has an elongated rib with a first stop on one side, and a pocket on another side. The stop and the pocket oppose one another and are spaced-apart from one another. A slider is slidably disposed on the rib of the base. The slider has a second stop opposing the first stop, and a cavity opposing the pocket. The adjustable width gap is defined between the first stop of the rib of the base and the second stop of the slider. The slider slides on the rib of the base to define an adjustable width of the adjustable width gap between the first and second stops. The slider slides between a narrower position and a wider position on the rib, corresponding to narrower and wider widths of the gap. A track is formed between the slider and the rib of the base, with the slider sliding with respect to the rib of the base along the track. The slider and the pocket of the rib are sized so that the slider overlaps the pocket, and so that a hollow is defined between the cavity of the slider and the pocket of the rib. A spring is disposed in the hollow, and is compressed between the pocket and the slider, to bias the slider and second stop towards the first stop. A first tab extends from a distal free end of the first stop; and a second tab extends from the distal free end of the second stop. The mobile device is disposed in the gap and pinched between the first and second stops. A ball and socket joint is disposed between the mount and the clamp, and pivotally couples the clamp to the mount, and thus pivotally couples the mobile device to the vent or the surface of the vehicle. The ball and socket joint has a ball pivotally disposed in a socket. The ball and socket joint has a friction fit or an interference fit between the ball and the socket sufficient to hold a position between the ball and the socket under a weight of the clamp and the mobile device without an applied external force.

In accordance with a more detailed aspect of the invention, the holder device can be adapted to be mounted to louvers of the vent of the vehicle. The mount can further comprise a clip having a proximal end extending from the vent and a distal free end engaging the louvers of the vent. The clip can have first and second perpendicular slots extending into the clip from the distal free end, and being oriented perpendicular to one another. The first slot defines a first pair of arms. A tooth can be formed on a distal free end of one of the first pair of arms and can extend into the first slot.

In accordance with another more detailed aspect of the invention, the holder device can be adapted to be mounted to the surface of the vehicle. The mount can further comprise a plate with an adhesive layer adapted to be adhered to the surface.

In addition, the invention provides a holder device configured to secure and carry a mobile device with respect to a surface or a vent of a vehicle. The holder device comprises a mount adapted to be affixable to the surface or the vent of the vehicle. A clamp is pivotally coupled to the mount. The clamp is spring-loaded and has an adjustable width gap configured to receive the mobile device therein. A ball and socket joint is disposed between the mount and the clamp, and pivotally couples the clamp to the clip, and thus pivotally couples the mobile device to the vent. The ball and socket joint has a ball pivotally disposed in a socket. The ball and socket joint has a friction fit or an interference fit between the ball and the socket sufficient to hold a position between the ball and the socket under a weight of the clamp and the mobile device without an applied external force. The clamp has an outward facing exposed surface. A recess is in the outward facing exposed surface of the clamp. A polyurethane dome is affixed in the recess. The polyurethane dome carries indicia indicative of or representing a business, a product, or both.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "mobile device" is used broadly herein to refer to a portable, hand-held electronic device, including by way of example, a cellular (cell) phone, a smart phone, a tablet computer or tablet, a phablet, a global positioning system (GPS), a mobile media player, a gaming system, a video monitor, and the like. Such a device can have a display screen upon which data, information, media, etc. is viewed; one or more inputs, such as buttons, a touch screen, etc.; one or more outputs, such as the screen, a speaker, an audio jack, etc.; a power supply, such as a battery; a data storage system and a computing system. Such a device can also include a port or socket for receiving a power and/or data connection cord or plug. The mobile device can have a back or back surface, and a front or front surface. The display or touch screen can occupy a great majority of the front of the mobile device. Mobile devices can have various different sizes, including different widths, lengths, or both. The mobile device can be rectangular with a smaller width and a greater height. By way of example, the mobile device can have a width or a height of approximately 55-80 mm.

The term "cellular phone" is used broadly herein to refer to a cellular phone, a cell phone, a smart phone, phablet, etc. Such cellular phones can be portable, handheld communication devices that can include a speaker, a microphone, a transmitter and a receiver (or transceiver), a power supply or battery, a display screen or touch screen display and input device, other input devices, such as one or more buttons, etc. The cellular phone can have a back or back surface, and a front or front surface. The display or touch screen can occupy a great majority of the front of the cellular phone. Cellular phones can have various different sizes, including different widths, lengths, or both. The width can extend laterally, side-to-side; while the height can extend longitudinally, up-and-down. The cellular phone can be rectangular with a smaller width and a greater height. By way of example, the cellular phone can have a width of approximately 55-80 mm.

The terms "business" and "company" are used broadly and interchangeably herein to refer to an organization that provides a product or a service. The business, company or organization can have a name, logo, slogan, trademark, service mark, etc. that is capable of identifying and/or distinguishing the business or company, or product or service, or both, or can otherwise be utilized to market, promote, and/or brand the business or company, or product or service, or both.

The terms "interference fit" and "friction fit" are terms of art used interchangeably herein to refer to deliberately causing, increasing and/or using friction to deliberately resist movement. An interference fit or friction fit is different than and greater than the existence of friction. While friction may exist between any two surfaces, is often desirable to do all one can to reduce this friction. An interference fit or friction fit can be distinguished from naturally occurring friction by being actually deliberately caused and increased. An interference fit can be created by dimensioning engaging parts so that their surfaces tightly bear against one another. A friction fit can be created by surface roughness that is rougher.

Description

As illustrated in FIGS. 1-15, a mounting clip or holder, indicated generally at 10, in an example implementation in accordance with the invention is shown to secure a mobile device 14 to a vent or a surface of a vehicle 18. In one aspect, the mounting clip or holder can be a vent mounted clip or holder to secure the mobile device to a vent 22 with louvers 26 of the vehicle 18. In another aspect, the mounting clip or holder can be a surface (e.g. dash or console) mounted clip or holder to secure the mobile device to the surface 28 (dash or console) of the vehicle. Thus, the clip or holder 10 of the present invention can removably secure the mobile device 14 to the vent 22 or surface 28 of the vehicle 18 in a convenient location for viewing, and without marring or altering the vehicle interior surfaces, such as the dashboard. In addition the clip or holder 10 has a ball and socket joint that allows the mobile device to be oriented as desired. Furthermore, the clip or holder 10 of has a spring-loaded clamp to releasably hold or carry the mobile device, and to quickly secure and release the mobile device.

The louvers 26 of the vent 22 can have multiple louvers, with multiple orientations, including orthogonal or perpendicular orientations. The clip or holder 10 can be or can have a universal clip that be secured to a single louver or multiple louvers of the vent in any orientation.

Figure 15:
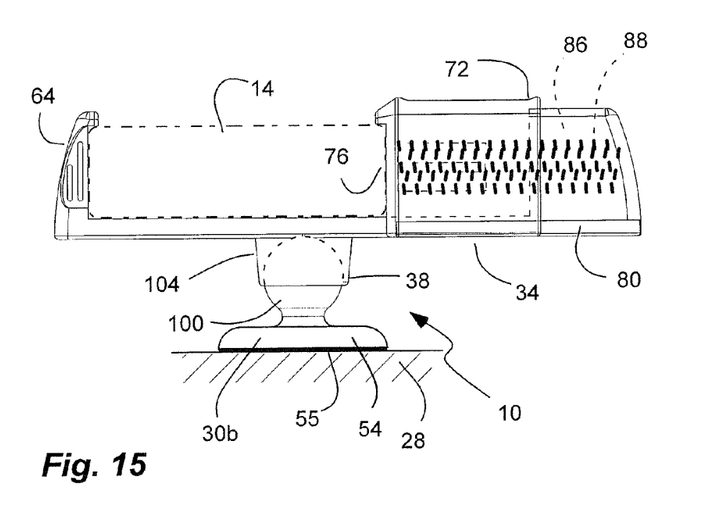
FIG. 15 is a top or bottom view of a mount with a ball of a ball-and-socket joint of the mounting clip or holder device of FIG. 1, shown holding the mobile device or cellular phone, and secured to a surface of the vehicle.

The clip or holder 10 can have a mount mounted or affixed to the vent or the surface of the vehicle. In one aspect, the mount can be or can have a clip 30 mounted or affixed to the vent 22 or louver(s) 26 thereof, as shown in FIGS. 1-12. In another aspect, the mount can be or can have an adhesive plate 30b mounted or affixed to the surface 28, as shown in FIG. 15. In addition, the clip or holder 10 can have a clamp 34 releasably holding or carrying the mobile device, and a ball-and-socket joint or connection 38 pivotally coupling the clamp 34 to the mount 30 or 30b, and thus pivotally coupling the mobile device 10 to the vent 22 or surface 28 of the vehicle. The clamp 34, and thus the mobile device 14, can be pivotal about multiple axes to properly orient the mobile device as desired.

Referring to FIGS. 1-6 and 10-13, the clip 30 has a proximal end extending from the vent 22 and disposed outside and in front of the vent. The clip 30 also has a distal free end engaging the louvers 26 of the vent. The clip 30 or distal free end thereof has first and second perpendicular slots 42 and 44 extending into the clip from the distal free end. The first and second slots 42 and 44 can be oriented perpendicular to one another to match common louver or vent configurations. The first slot 42 defines a first pair of arms 46 and 48. A tooth 52 can be formed on a distal free end of one of the first pair of arms, and can extend into the first slot 42. The tooth 52 can engage a rear of the louver to maintain the clip affixed to the louver. In addition, the second slot 44 can define a second pair of arms in the first pair of arms, so that there are four arms to engage all sides of a louver configuration. The first slot 42 can be deeper than the second slot 44. The clip 30 can have a wide width, wider than a ball or ball-and-socket connection 38, to resist twisting of the clip with respect to the louver.

Referring to FIG. 15, the adhesive plate 30b has a plate 54 with an adhesive layer 55 to be adhered to the surface 28 of the vehicle. The plate can have a round, flat surface with a 3M adhesive. The adhesive plate can be applied to any surface.

Referring again to FIGS. 1-9, the clamp 34 is pivotally coupled to the mount, such as to the proximal end of the clip 30. The clamp 34 is spring-loaded, and has an adjustable width gap 54 receiving the mobile device 14 therein or therebetween. The clamp 34 can pinch the mobile device 14 to provide a friction grip to hold the mobile device. The clamp 34 has a base 56 pivotally coupled to the proximal end of the clip 30. The base 56 has an elongated rib 60 with a first stop 64 on one side. The rib 60 and first stop 64 can be L-shaped. The rib 60 also has a pocket 68 on another side, with the first stop 64 and the pocket 68 opposing one another and spaced-apart from one another. The rib, the first stop and the pocket can form a broad U-shaped member.

A slider 72 is slidably disposed on the rib 60 of the base 56, near or adjacent to the pocket 68. The slider 72 has a second stop 76 opposing the first stop 64. A surface of the slider opposing the first stop can define the second stop. The gap 54 is defined between the first stop 64 of the rib of the base and the second stop 76 of the slider (and the rib of the base). The slider 72 sliding on the rib of the base defines a variable or adjustable width of the gap 54 between the first and second stops. The slider 72 can slide between a narrower (FIGS. 1, 2a, 2b, 5 and 6) and a wider (FIG. 3) position on the rib, corresponding to narrower and wider widths of the gap (and narrower and wider mobile device). In one aspect, the slider 72 can have a distance of travel of approximately 25 mm, and the gap can have a variable or adjustable width between 55-80 mm.

In addition, a track can be formed between the slider 72 and the rib 60 of the base 56 with the slider sliding with respect to the rib of the base along the track. The track can comprise a pair of elongated grooves 80 on opposite edges of the rib 60 of the base. The slider 72 can comprise opposing tabs 84 slidably disposed in the grooves. In another aspect, the track can be formed in the slider and the tabs on the base.

Figure 3:
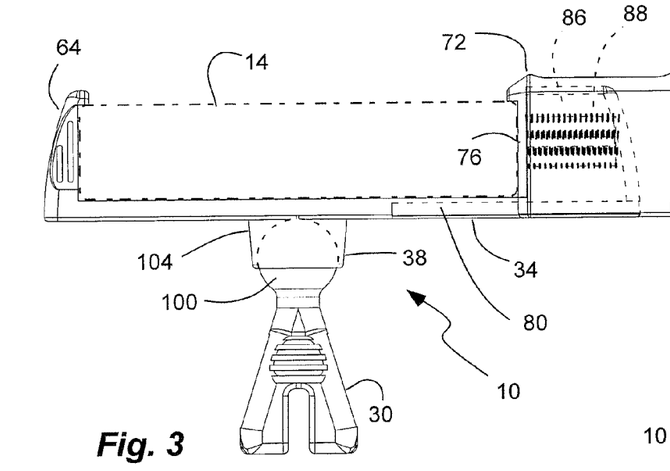
FIG. 3 is a top or bottom view of the mounting clip or holder device of FIG. 1, shown in a wider position or configuration.
Figure 4:
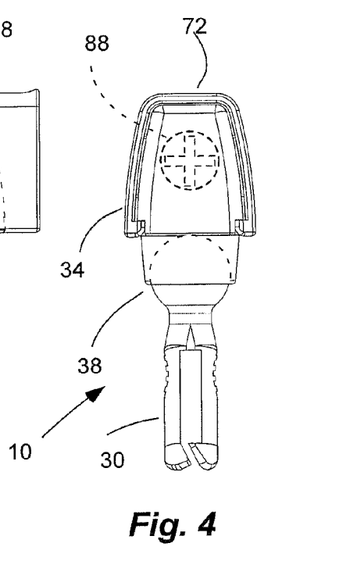
FIG. 4 is an end view of the mounting clip or holder device of FIG. 1.
Figure 5:
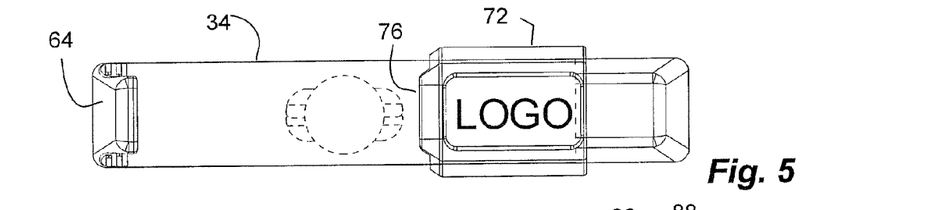
FIG. 5 is a front view the mounting clip or holder device of FIG. 1, shown in a narrower position or configuration.
Figure 6:
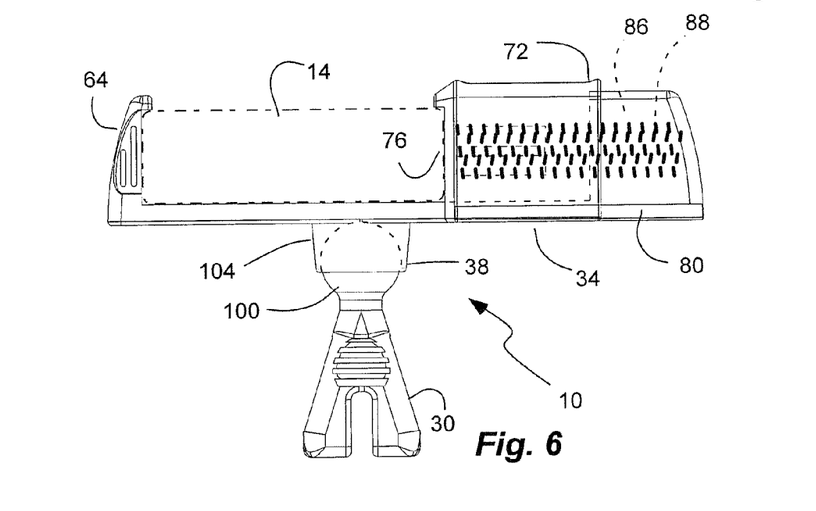
FIG. 6 is a top or bottom view of the mounting clip or holder device of FIG. 1, shown in the wider position or configuration.
Figure 7:
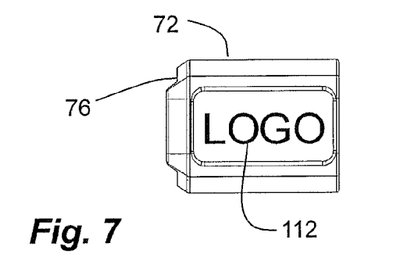
FIG. 7 is a front view of a slider of the mounting clip or holder device of FIG. 1.
Figure 8:
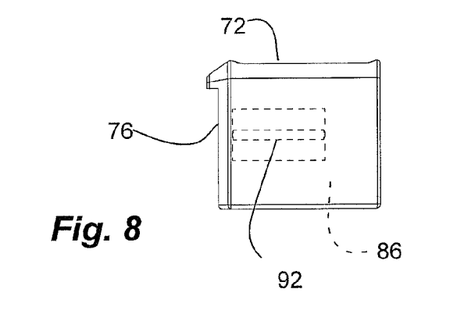
FIG. 8 is a side view of the slider of the mounting clip or holder device of FIG. 1.
Figure 9:
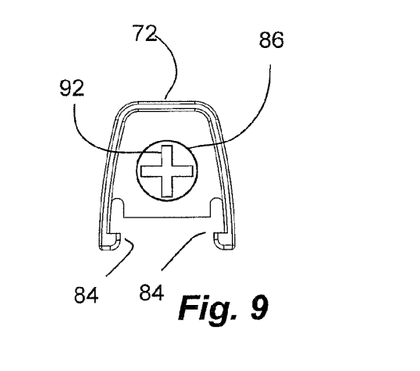
FIG. 9 is an end view of the slider of the vent mounted clip or holder device of FIG. 1.
Figure 10:
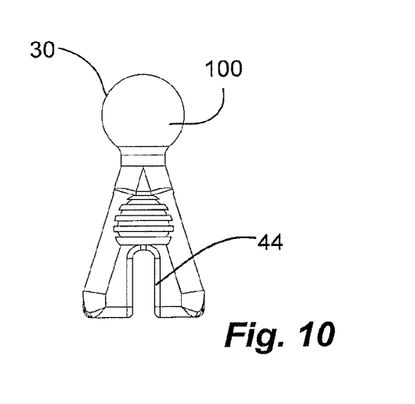
FIG. 10 is a top or bottom view of a clip with a ball of a ball-and-socket joint of the mounting clip or holder device of FIG. 1.
Figure 11:
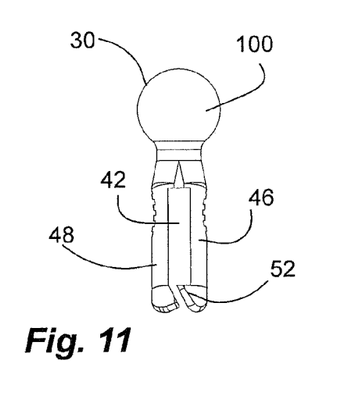
FIG. 11 is a side view of the clip with the ball of the ball-and-socket joint of the mounting clip or holder device of FIG. 1.
Figure 12:
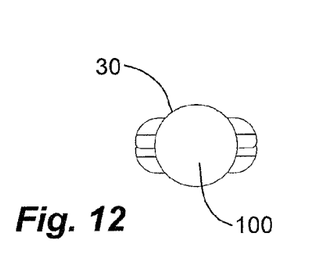
FIG. 12 is front view of the clip with the ball of the ball-and-socket joint of the mounting clip or holder device of FIG. 1.
Figure 13:
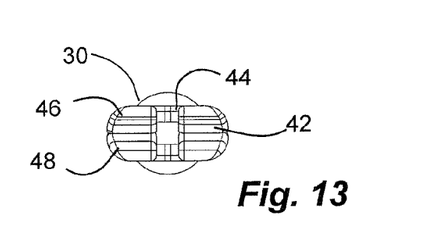
FIG. 13 is a rear view of the clip with the ball of the ball-and-socket joint of the mounting clip or holder device of FIG. 1.

In addition, the slider 72 can have a cavity 86 opposing and facing the pocket 68 or interior thereof of the rib or base. Thus, the slider can form a shell. The slider 72 and the pocket 68 can be sized so that the slider overlaps the pocket, and the pocket becomes a shell mating and nesting within the slider. The slider can overlap the pocket when sliding. A hollow is defined between the cavity 86 of the slider 72 and the pocket, or interior thereof. A spring 88 is disposed in the hollow and is compressed between the pocket 68 and the slider 72 to bias the slider and second stop towards the first stop. A post 92 (FIGS. 8 and 9) is disposed in the cavity 86 of the slider 72, and aligned with the spring 88. The post can receive an end of the spring thereon. The post 92 extends from the second stop 76, or rear wall thereof, towards the pocket 68. The post 92 has a length to abut to a wall of the pocket 68 in a widest position of the slider corresponding to a widest width of the gap, as shown in FIG. 3. Thus, the clamp can be spring-loaded.

Furthermore, the clamp 34 can have a first tab 96 extending from a distal free end of the first stop 64, and a second tab 98 extending from the distal free end of the second stop 76. The tabs can extend towards one another, and out over the gap and the rib, to support the mobile device, and resist inadvertent release of the mobile device from the clamp. A non-slip, high-friction, grip material can be disposed on the inner surfaces of the stops and the rib to grip the mobile device. The mobile device 14 is disposed in the gap 54, and pinched between the first and second stops 64 and 76.

The ball-and-socket joint or connection 38 can be disposed between the mount, or the clip 30 or the plate 30b, and the clamp 34, and pivotally couples the mount to the clip, and thus pivotally couples the mobile device 10 to the vent 22 or surface 28 and the vehicle 18. The ball and socket joint has a ball 100 pivotally disposed in a socket 104. The ball and socket joint has a friction fit or an interference fit between the ball 100 and the socket 104 sufficient to hold a position between the ball and the socket under a weight of the clamp and the mobile device without an applied external force. In one aspect, the ball 100 can be formed on the proximal end of the clip 30 or can extend from the adhesive plate 30b, while the socket 104 can be formed on a back of the rib 60 of the base 56 of the clamp 34. In another aspect, the ball can be formed on the base, and the socked can be formed in the clip or the adhesive plate. One or more slots 108 (FIG. 4) can extend into the socket, bifurcating the socket into two or more portions displaceable away from one another upon insertion of the ball into the socket. The at least two portions can form leaf springs bearing against ball and resisting movement of the ball within the socket.

All the parts of the holder or clip 10, except for the spring, can be formed of plastic, such as by injection molding.

Figures 1, 2A, 2B:
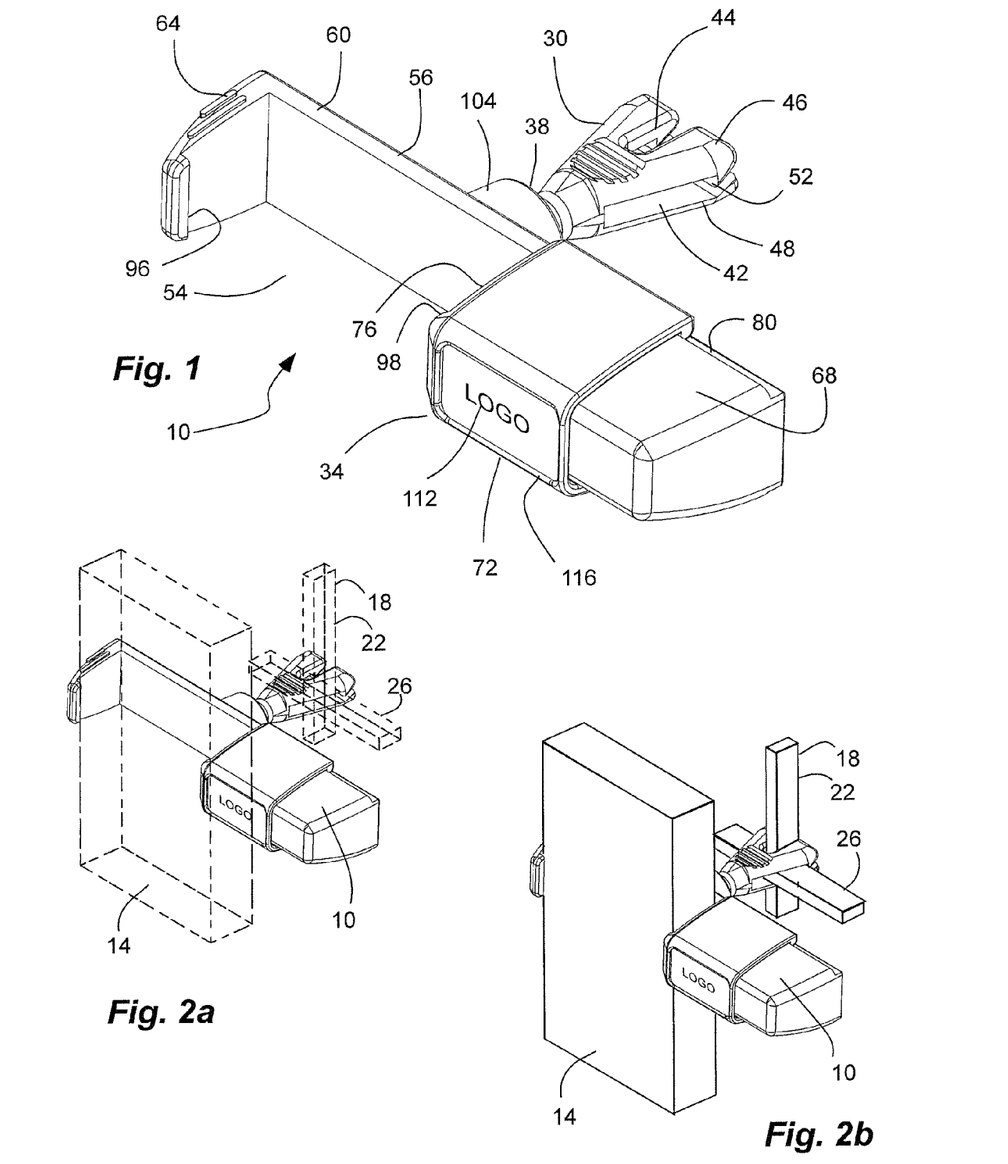
FIG. 1 is a perspective view of a mounting clip or holder device in accordance with an embodiment of the present invention.
FIGS. 2a and 2b are perspective views of the mounting clip or holder device of FIG. 1, shown holding a mobile device or cellular phone, and secured to a louver(s) of a vent of a vehicle.
Figure 14:
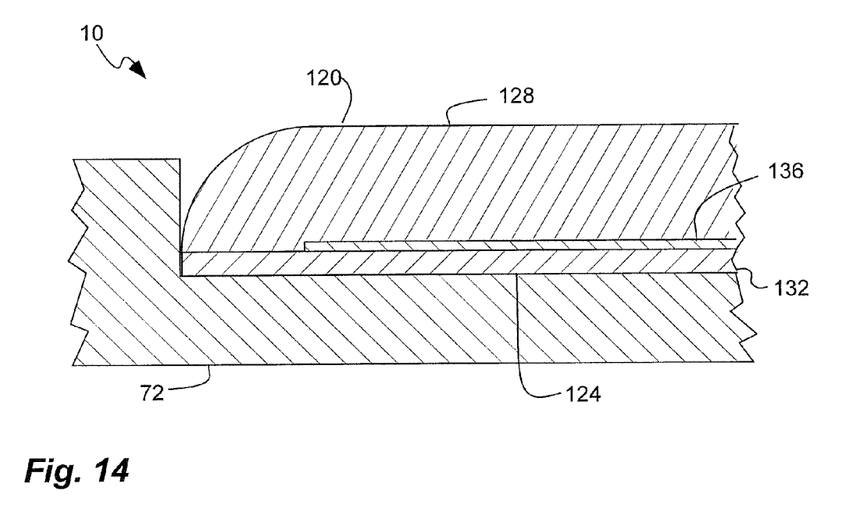
FIG. 14 is a partial cross-sectional view of the slider of the mounting clip or holder device of FIG. 1, showing a polyurethane dome.

In addition, referring to FIGS. 1 and 14, the holder or clip 10 can include indicia 112 indicative of or representing a business, a product, or both. Thus, the device 10 can be utilized as a promotional device, and distributed to potential customers, to place the indicia in ready view of users. Thus, the indicia can include a logo or picture. In another aspect, the indicia can include instructions for use, warnings regarding use, etc. The clamp or slider 72 can have an outward facing exposed surface. The indicia 112, indicative of or representing a business, a product, or both, can be disposed on the outward facing exposed surface of the slider. In one aspect, the slider can have a recess 116 in the outward facing exposed surface of the slider. A polyurethane dome 120 can be affixed in the recess 116. The polyurethane dome 120 can include or carry the indicia. In addition, the polyurethane dome can have tacky properties to which items can be removably secured. Thus, the holder or clip 10 can provide both a holder for the mobile device, and a tacky surface to receive items. The items can include, paper notes, paper receipts, keys, etc.

The polyurethane dome 120 can be adhered to the slider 72 or the recess 116 or outward facing exposed surface thereof by an adhesive film 124. The dome can have a broad, flat shape with an outfacing surface 128 parallel with the slider or outward facing exposed surface, and surrounded by a radius perimeter. A majority, or essentially all, of the outward facing surface can be continuous and smooth and parallel with the slider or the outward facing exposed surface. In addition, the outward facing surface can be flat or substantially flat. Furthermore, the outward facing surface can be surrounded by a radius perimeter. Thus, the perimeter of the outward facing surface curves toward the slider. In one aspect, all of the outward facing surface can be flat and smooth and continuous between the radiused perimeter. Thus, the dome can resist snagging on other objects. The outfacing surface can be tacky, and can cling to an item by specific or mechanical adhesion. The tackiness of the outward surface can be obtained through various factors, which can include material, hardness/softness, and coefficient of friction. As described above, the dome can be formed of polyurethane. The polyurethane can be formed by combining a polyol with a catalyst or hardener. In one aspect, the ratio of polyol to catalyst can be between 0.85 to 0.95, and about 0.90 in another aspect, so that there is more polyol than catalyst. In another aspect, the ratio of polyol to catalyst can be between 0.63 to 0.85 in one aspect, and between 0.63 to 0.75 in another aspect, so that there is more polyol than catalyst. Typical polyurethane is obtained by mixing polyol and catalyst in a 1:1 ratio. In addition, in one aspect, the outward facing surface or dome can have a hardness between 10 and 35 Shore D. In another aspect, the outward facing surface or dome can have a hardness between 12 and 21 Shore D. In another aspect, the outward facing surface or dome can have a hardness between 12 and 18 Shore D. Other non-tacky stickers or decals typically can have a hardness of 60 Shore D or harder. Furthermore, the outward facing surface can have a coefficient of friction of between 0.3 and 0.1 in accordance with ASTM D 1894.

The polyurethane dome can include an adhesive film 124 adhered to the dome. The adhesive can be selected to provide sufficient adhesion between the polyurethane dome and the slider. The adhesive film can use a chemical adhesive that adheres to the dome and slider. In addition, the adhesive and/or the adhesive film can be substantially transparent, or at least translucent. The adhesive film can be disposed on a substrate 132. The substrate can also be a film. In one aspect, the substrate can be substantially non-absorbent. The substrate can provide a surface, such as an upper surface opposite the adhesive that can be printable. In addition, the substrate can be substantially transparent, or at least translucent. The substrate can be a printed 3M Graphics Vinyl. Alternatively, the substrate can be a polyester film. The substrate can be any laminated (non-porous) substrate, including: PP, PVC, PET, ABS, polyester, regular sticker paper, vinyl, or tin metal (foil). Alternatively, the substrate can be other films with other characteristics, such as reflective, metal shine, textured, etc. A strength of the adhesive bond between the adhesive film and the slider can be greater than a tacky cling between the outward facing exposed surface and the item(s). Thus, the dome remains on the slider or holder while the item is removed from the dome.

Furthermore, the polyurethane dome 120 can be substantially transparent, or at least translucent. A graphic layer 136 can be disposed behind the dome and visible through the dome. Thus, the graphic layer can be disposed between the slider (or adhesive film) and the dome, or between the substrate and the dome. The graphic layer can include ink disposed on or printed on the substrate. For example, the graphic layer can be an aqueous based inkjet ink. The graphic layer can include the indicia. The graphic layer can include indicia that can be or can include letters, symbols, figures, pictures, logos, art, corporate messages, slogans, bi-lines, icons, etc. that are associated with or that form a representation of a business, company or organization or the like, or a product, service or the like, or both. Furthermore, the graphic layer can be or can include other inclusions, as described in greater detail below. The graphic layer can be visible through the dome. Thus, the dome can protect the indicia. The graphic layer and/or inclusion can be smaller or can have a smaller size than the substrate and dome such that the graphic layer and inclusion are surrounded by a perimeter of the dome and substrate.

As discussed above, the dome or outward facing surface can have a radius perimeter. The dome can be made by pouring the polyurethane material on top of the substrate and graphic layer to form the dome. Thus, the radius perimeter is obtained by individual pouring each dome, without stamping or cutting the domes from a continuous layer. The graphic layer can be printed on the substrate having the adhesive film opposite the graphic layer. The graphic layer can be a discrete graphic contained within the dome, as opposed to a continuous graphic.

As indicated above, the graphic layer can be or can include an inclusion. The inclusions can be embedded in the dome. For example, the graphic layer can be an etched metallic layer. The metallic layer can be etched to form the indicia. Other inclusions can be an LED (or other light source) and a battery power source; a hologram or lenticular artwork; an RFID computer chip or tag; a mirror; one or more gems or faux gems; etc. For example, another dome as described above can have an LED electrically coupled to a battery. The LED may remain continuously activated or lit. Alternatively, the LED may be activated, or the leads for the LED selectively contacted by the battery, such as by pressure applied to the dome. Alternatively, a light sensor can be electrically coupled between the battery and the LED to activate the LED in low light conditions. Other electronics can be included for special effects, such as flashing, etc. It will be appreciated that multiple lights or LEDs of one or more color can be included or embedded in the dome. As another example, another dome as described above can have a gem or faux gem embedded in the dome. The inclusion(s) can be disposed on the adhesive film and/or substrate, and surrounded by the material of the dome so that the inclusion projects into the dome. Thus, the inclusions can be inclusions for the dome and/or the graphics layer.

The dome can also include inclusions embedded therein. For example, the dome can include a scented material, such as a scented oil, that is permeable through the polyurethane material of the dome. In addition, the dome can be colored and translucent. Furthermore, the dome can include a florescent material.

In another aspect, the polyurethane layer or dome can be opaque with a graphic layer, such as printing, on the outfacing surface.

In another aspect, the indicia can be printed on or molded into the dome itself, such as on the top or front thereof.

A method of securing the mobile device 14 to the vent 22 of the vehicle 18 using the holder or clip 10, includes:

1) affixing the clip 30 of the holder to the louver 26 of the vent with the louver of the vent received within one of the pair of slots 42 and 44;

2) sliding the slider 72 to the wider position;

3) disposing the mobile device 14 in the gap 54;

4) releasing the slider to bear against the mobile device with the spring 88 pinching the mobile device between the first and second stops 64 and 76;

5) pivoting the clamp 34 with respect to the clip to a desired orientation;

6) sliding the slider to the wider position; and
7) removing the mobile device from the holder.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A holder device in combination with a mobile device and a vent or a surface of a vehicle, the holder device comprising:
   a) a mount affixable to the vent or the surface of the vehicle;
   b) a clamp pivotally coupled to the mount, the clamp being spring-loaded and having an adjustable width gap receiving the mobile device therein, the clamp comprising:
      i) a base pivotally coupled to the mount, the base having an elongated rib with a first stop on one side, and a pocket on another side, with the stop and the pocket opposing one another and spaced-apart from one another;
      ii) a slider slidably disposed on the rib of the base, the slider having a second stop opposing the first stop, and a cavity opposing the pocket;
      iii) the adjustable width gap being defined between the first stop of the rib of the base and the second stop of the slider;
      iv) the slider sliding on the rib of the base to define an adjustable width of the adjustable width gap between the first and second stops, and sliding between a narrower position and a wider position on the rib corresponding to narrower and wider widths of the gap;
      v) a track formed between the slider and the rib of the base with the slider sliding with respect to the rib of the base along the track;
      vi) the slider and the pocket of the rib being sized so that the slider overlaps the pocket and a hollow is defined between the cavity of the slider and the pocket of the rib;
      vii) a spring disposed in the hollow and being compressed between the pocket and the slider to bias the slider and second stop towards the first stop;
      viii) a first tab extending from a distal free end of the first stop, and a second tab extending from the distal free end of the second stop; and
      ix) the mobile device disposed in the gap and pinched between the first and second stops; and
   c) a ball and socket joint disposed between the mount and the clamp, and pivotally coupling the clamp to the mount, and thus pivotally coupling the mobile device to the vent or the surface of the vehicle, the ball and socket joint having a ball pivotally disposed in a socket, the ball and socket joint having a friction fit or an interference fit between the ball and the socket sufficient to hold a position between the ball and the socket under a weight of the clamp and the mobile device without an applied external force.

2. The combination in accordance with claim 1, wherein the holder device is adapted to be mounted to louvers of the vent of the vehicle, and wherein the mount further comprises:
   a clip having a proximal end extending from the vent and a distal free end engaging the louvers of the vent, the clip having first and second perpendicular slots extending into the clip from the distal free end, and being oriented perpendicular to one another, the first slot defining a first pair of arms, and a tooth being formed on a distal free end of one of the first pair of arms and extends into the first slot.

3. The combination in accordance with claim 1, wherein the ball is formed on the mount, and wherein the socket is formed on a back of the rib of the base of the clamp.

4. The combination in accordance with claim 1, wherein the holder device is adapted to be mounted to the surface of the vehicle, and wherein the mount further comprises:
   a plate with an adhesive layer adapted to be adhered to the surface.

5. The combination in accordance with claim 1, wherein the slider has a distance of travel of approximately 25 mm, and the gap has the adjustable width between 55-80 mm.

6. The combination in accordance with claim 1, wherein the track comprises elongated grooves on opposite edges of the rib of the base; and wherein the slider comprises opposing tabs slidably disposed in the grooves.

7. The combination in accordance with claim 1, further comprising:
   a) a post disposed in the cavity of the slider and aligned with the spring, and receiving an end of the spring thereon; and
   b) the post extending from the second stop towards the pocket, and having a length to abut to a wall of the pocket in a widest position of the slider corresponding to a widest width of the gap.

8. The combination in accordance with claim 1, wherein the socket further comprises:
   at least one slot extending into the socket bifurcating the socket into at least two portions displaceable away from one another upon insertion of the ball into the socket, and with the at least two portions forming leaf springs bearing against ball and resisting movement of the ball within the socket.

9. The combination in accordance with claim 1, further comprising:
   a) an outward facing exposed surface on the slider; and
   b) indicia indicative of or representing a business, a product, or both, disposed on the outward facing exposed surface of the slider.

10. The combination in accordance with claim 1, further comprising:
   a) an outward facing exposed surface on the slider;
   b) a recess in the outward facing exposed surface of the slider; and
   c) a polyurethane dome affixed in the recess.

11. The combination in accordance with claim 10, wherein the polyurethane dome has a continuous outward facing surface with a majority being continuous, smooth and parallel with the outward facing exposed surface.

12. The combination in accordance with claim 10, wherein the polyurethane dome extends higher than the recess.

13. The combination in accordance with claim 10, further comprising:
   an adhesive film adhering the polyurethane dome to the recess.

14. The combination in accordance with claim 10, wherein the polyurethane dome is translucent or transparent;

and further comprising a graphic layer disposed between the slider and the polyurethane dome, and visible through the polyurethane layer.

15. The combination in accordance with claim 14, further comprising:
a substrate with an adhesive film on one side and the graphic layer printed on the other side.

16. The combination in accordance with claim 10, wherein an outfacing surface of the polyurethane dome is tacky; and wherein the polyurethane dome is formed by polyol and catalyst in a ratio of between 0.85 to 0.95.

17. The combination in accordance with claim 10, wherein the polyurethane dome has a hardness between 10 and 35 Shore D.

18. The combination in accordance with claim 10, wherein an outfacing surface of the polyurethane dome has a coefficient of friction of between 0.3 and 0.1 in accordance with ASTM D 1894.

19. A method of securing the mobile device to the vent of the vehicle using the combination in accordance with claim 2, comprising:
a) affixing the clip of the holder to the louver of the vent with the louver of the vent received within one of the pair of slots;
b) sliding the slider to the wider position;
c) disposing the mobile device in the gap;
d) releasing the slider to bear against the mobile device with the spring pinching the mobile device between the first and second stops;
e) pivoting the clamp with respect to the clip to a desired orientation;
f) sliding the slider to the wider position; and
g) removing the mobile device from the holder.

20. A holder device configured to secure and carry a mobile device with respect to a surface or a vent of a vehicle, the holder device comprising:
a) a mount adapted to be affixable to the surface or the vent of the vehicle;
b) a clamp pivotally coupled to the mount, the clamp being spring-loaded and having an adjustable width gap configured to receive the mobile device therein;
c) a ball and socket joint disposed between the mount and the clamp, and pivotally coupling the clamp to the clip, and thus pivotally coupling the mobile device to the vent, the ball and socket joint having a ball pivotally disposed in a socket, the ball and socket joint having a friction fit or an interference fit between the ball and the socket sufficient to hold a position between the ball and the socket under a weight of the clamp and the mobile device without an applied external force;
d) an outward facing exposed surface on the clamp;
e) a recess in the outward facing exposed surface of the clamp;
f) a polyurethane dome affixed in the recess; and
g) indicia indicative of or representing a business, a product, or both, carried by the polyurethane dome; and
wherein the clamp further comprises:
a base pivotally coupled to the mount, the base having an elongated rib with a first stop on one side, and pocket on another side, with the stop and the pocket opposing one another and spaced-apart from one another;
a slider slidably disposed on the rib of the base, the slider having a second stop opposing the first stop, and a cavity opposing the pocket;
the gap being defined between the first stop of the rib of the base and the second stop of the slider;
the slider sliding on the rib of the base to define a adjustable width of the gap between the first and second stops, and sliding between a narrower and a wider position on the rib corresponding to narrower and wider widths of the gap;
a track formed between the slider and the rib of the base with the slider sliding with respect to the rib of the base along the track;
the slider and the pocket being sized so that the slider overlaps the pocket and a hollow is defined between the cavity of the slider and the pocket;
a spring disposed in the hollow and being compressed between the pocket and the slider to bias the slider and second stop towards the first stop; and
a first tab extending from a distal free end of the first stop, and a second tab extending from the distal free end of the second stop.

21. A holder device in combination with a mobile device and a vent of a vehicle, the vent having louvers, the holder device being mounted to the louvers of the vent and removably carrying the mobile device to secure the mobile device to the vehicle, the holder device comprising:
a) a clip having a proximal end extending from the vent and a distal free end engaging the louvers of the vent, the clip has first and second perpendicular slots extending into the clip from the distal free end, and being oriented perpendicular to one another, the first slot defines a first pair of arms, a tooth is formed on a distal free end of one of the first pair of arms and extends into the first slot;
b) a clamp pivotally coupled to the proximal end of the clip, the clamp being spring-loaded and having an adjustable width gap receiving the mobile device therein, the clamp comprising:
i) a base pivotally coupled to the proximal end of the clip, the base having an elongated rib with a first stop on one side, and pocket on another side, with the stop and the pocket opposing one another and spaced-apart from one another;
ii) a slider slidably disposed on the rib of the base, the slider having a second stop opposing the first stop, and a cavity opposing the pocket;
iii) the gap being defined between the first stop of the rib of the base and the second stop of the slider;
iv) the slider sliding on the rib of the base to define an adjustable width of the gap between the first and second stops, and sliding between a narrower and a wider position on the rib corresponding to narrower and wider widths of the gap;
v) a track formed between the slider and the rib of the base with the slider sliding with respect to the rib of the base along the track;
vi) the slider and the pocket being sized so that the slider overlaps the pocket and a hollow is defined between the cavity of the slider and the pocket;
vii) a spring disposed in the hollow and being compressed between the pocket and the slider to bias the slider and second stop towards the first stop;
viii) a first tab extending from a distal free end of the first stop, and a second tab extending from the distal free end of the second stop; and
ix) the mobile device disposed in the gap and pinched between the first and second stops; and
c) a ball and socket joint disposed between the clip and the clamp, and pivotally coupling the clamp to the clip, and thus pivotally coupling the mobile device to the vent, the ball and socket joint having a ball pivotally disposed in a socket, the ball and socket joint having a friction fit or an interference fit between the ball and the socket sufficient to hold a position between the ball and the socket under a weight of the clamp and the mobile device without an applied external force.

\* \* \* \* \*